United States Patent [19]
Odermatt

[11] Patent Number: 4,624,584
[45] Date of Patent: Nov. 25, 1986

[54] SLIDING JOURNAL BEARING
[75] Inventor: Robert Odermatt, Brüttisellen, Switzerland
[73] Assignee: BBC Brown, Boveri & Company, Limited, Baden, Switzerland
[21] Appl. No.: 619,990
[22] Filed: Jun. 12, 1984
[30] Foreign Application Priority Data
  Jul. 1, 1983 [CH] Switzerland ............ 3624/83
[51] Int. Cl.$^4$ ............ F16C 3/04; F16C 32/06
[52] U.S. Cl. ............ 384/114; 384/100; 384/399
[58] Field of Search ............ 384/100, 114, 118, 111, 384/107, 286, 399, 388, 398, 288, 294

[56] References Cited
U.S. PATENT DOCUMENTS

| | | | |
|---|---|---|---|
| 353,229 | 11/1886 | Lusson | 384/388 |
| 559,076 | 4/1896 | Conner | 384/388 |
| 990,583 | 4/1911 | Northrup et al. | 384/388 |
| 2,879,111 | 3/1959 | Heinrich et al. | 384/114 |
| 3,132,906 | 5/1964 | Sternlicht | 384/114 |
| 3,276,676 | 10/1966 | Buske | 384/100 X |
| 3,743,367 | 7/1973 | Raimondi | 384/114 |
| 3,804,474 | 4/1974 | Ettles | 384/399 |
| 3,964,805 | 6/1976 | Schulien | 384/399 |
| 4,455,098 | 6/1984 | Pollok | 384/399 X |

Primary Examiner—Stuart S. Levy
Assistant Examiner—Lynn M. Sohacki
Attorney, Agent, or Firm—Burns, Doane, Swecker & Mathis

[57] ABSTRACT

The bearing sliding surface of the sliding journal bearing is composed of two surface parts of two circular cylinders whose axes are located at a distance apart. A diametral plane defined by the two axes of these circular cylinders includes, together with a horizontal plane through the bearing axis, an angle of approximately 35°. At least one oil supply hole enters into each bearing bore underneath and above the horizontal plane and is displaced in the rotational direction of the shaft by approximately the same angle relative to the horizontal plane. A throttle can be provided in a pipe upstream of the upper oil supply hole.

2 Claims, 1 Drawing Figure

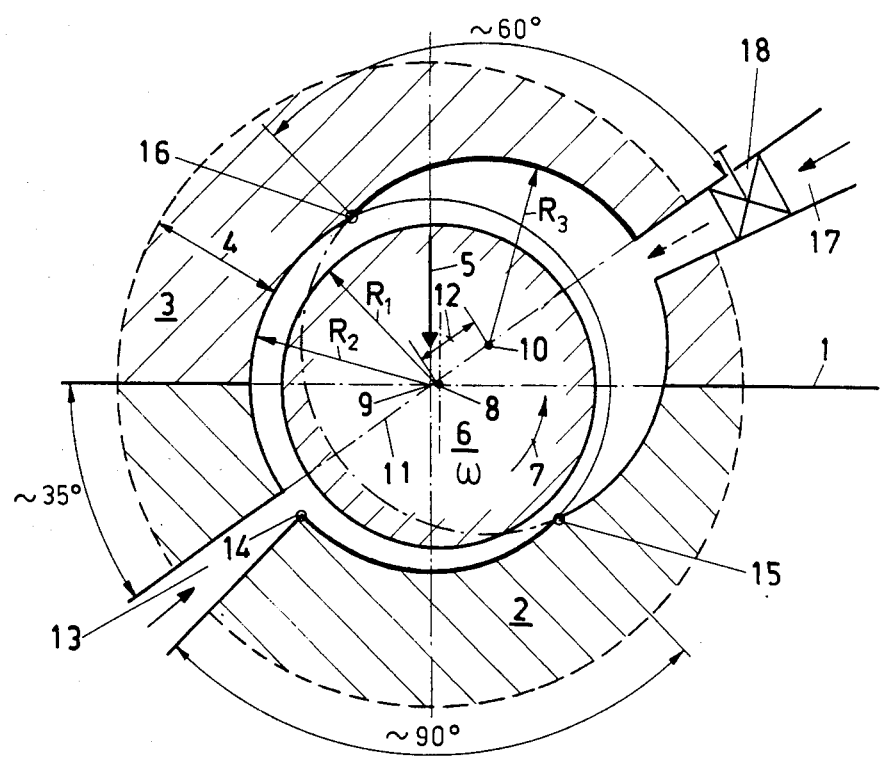

SLIDING JOURNAL BEARING

BACKGROUND OF THE INVENTION

The present invention concerns a sliding journal bearing.

In sliding journal bearings with hydrodynamic lubrication, the problem exists in maintaining the formation of the lubricant wedge between the bearing shell and the shaft with certainty over the complete rotational speed and load range and to attain good shaft guidance with the smallest possible movement of the shaft axis from the required position. In order to obtain these properties, bearing shells have been proposed with the most varied cross-sections normal to the axis. The simplest cross-section known for lightly loaded sliding journal bearings is the circular one with a clearance relative to the shaft such that, after attaining a certain peripheral speed of the shaft journal, a lubricant wedge capable of carrying load is formed by hydrodynamic effects and separates the sliding surfaces of the shaft and the bearing shell from one another. Support is then supplied in the region of liquid friction or "floating friction", after the shaft has previously had to pass through the mixed friction region below the peripheral speed mentioned above. This simplest design of the bearing running surface has the disadvantage that the shaft axis is displaced in operation relative to the rest position, the displacement becoming greater as the lubricant wedge becomes more strongly formed. The location of the shaft journal on the bearing shell is then "single line", i.e. along a generatrix of the shaft journal surface. In this respect, the obtention of a "two line" support of the shaft in the bearing sliding surface, or "lemon clearance" wherein the bearing shell or bearing half shells are widened in a wedge shape in the region above and below the dividing plane, is a solution to the shaft displacement problem caused by a "single line" support. Two diametrically opposed lubricant wedges are formed during operation and provide double line location. A variant of this concept having the same effect is the "displaced lemon clearance" of Klemencic. This method also has double line location. In the case of high accuracy bearings, such as are necessary for the main spindles of lathes, milling machines and other highly loaded machine tools, there are special designs with three and four line location and, consequently, three or four lubricant wedges.

For the lubrication of the two bearing types last mentioned, reliance is not generally placed on the build-up of a hydrodynamically occurring lubricant wedge and lubrication film. Rather, the lubrication is hydrostatically ensured by a continuous supply of oil under pressure. Such pressure circulation lubrication also guarantees, in association with an oil cooler, oil filter, etc., the removal of the bearing frictional heat, this being a precondition for reliable, continuous operation.

As far as the two bearing types mentioned with lemon clearance are concerned, these are generally designed in two parts with a horizontal dividing plane because of the method of manufacture. Relative to the first mentioned single shell construction with a circular bore, this implies more complicated and expensive manufacture. These inhibiting considerations must be balanced against the advantage of the double line location and better shaft axis centering already mentioned.

Still more expensive, of course, are the bearing types mentioned having three and four line location for higher requirements with respect to load carrying capacity, reliable lubrication and centering of the shaft axis.

SUMMARY OF THE INVENTION

The present invention, has the object of producing a fully enclosed sliding journal bearing which, compared with a fully enclosed sliding journal bearing of the same size with a circular bore, should exhibit higher load carrying capacity, improved stability properties at low loading and high rotational speed, and relatively low frictional power loss at large shaft diameters and high rotational speeds. Compared with the other types of sliding journal bearings described in the introduction, the present invention should at least be superior in terms of the previously mentioned running properties and, in addition, be universally applicable, have a relatively simple construction and be cheaper to manufacture because it should be possible to produce the bearing cross-section normal to the axis purely by machining operations on a lathe.

BRIEF DESCRIPTION OF THE DRAWING

The FIGURE shows the geometrical relationship of parts of the invention in a cross section taken normal to the axis of the bearing bore.

DETAILED DESCRIPTION OF THE PREFERRED EMBODIMENT

The diagrammatically simplified material parts of the sliding journal bearing shown, i.e. a support shell 2 located beneath a horizontal dividing plane 1 and an upper shell 3 located above it, preferably consist of white metal, using a shell thickness 4 corresponding to the weight loading of the bearing. The vertical weight loading is represented by a weight arrow 5. A rotational direction arrow 7 gives the rotational direction of a shaft 6, the angular velocity of the shaft being $\omega$, its radius being $R_1$, and the center of its cross-section being indicated by 8.

The major portion of the bearing sliding surface of the support shell 2 is limited by a cylindrical surface whose cross-section is a circle with the center 9 and the radius $R_2$. The residual part of the bearing sliding surface of the support shell 2 is limited by a cylindrical surface whose cross-section is a circle with the center 10 and the radius $R_3$. $R_3$ is equal to $R_2$ and the center 10 is displaced upwards towards the right along a diametrical line 11 by the distance $12 = 2(R_2 - R_1)$, i.e. by twice the bearing clearance of the bearing shell 2. The diametral line 11 is inclined relative to the horizontal dividing plane 1 by approximately 35°. An oil supply hole 13 is provided, displaced by approximately the same angle relative to the horizontal in the rotational direction, a convergent lubricant wedge extending over an arc of approximately 90° in the shaft rotational direction from the entry of the oil supply bore into the bearing gap of the bearing shell 2. In the bearing sliding surface of the bearing shell 2, this arc corresponds to the distance from the point 14, the lowest point of the entry of the oil supply hole 13 in the bearing bore of the bearing shell 2, to the lower intersection point 15 of the two circles with the radii $R_2$ and $R_3$. The above mentioned angular displacement of the oil supply hole relative to the horizontal dividing plane I therefore provides a bearing sliding surface over an arc of approximately 90° and located symmetrically about the load direction. The bearing clearance in the bearing shell 2 is optimised according to the laws of hydrodynamics.

One part of the circular cylinder of radius $R_3$ mentioned above forms the major part of the bearing sliding surface of the upper shell 3, extending as far as the intersection 16 of the two circles with the radii $R_3$ and $R_2$. The remaining part of the bearing sliding surface of the upper shell is formed by a part of the circular cylindrical surface with the radius $R_2$.

An oil supply hole 17 is provided in the upper shell for oil supply. This oil supply hole, like the lower oil supply hole 13, is displaced by approximately 35° to the horizontal in the direction of rotation of the shaft, so that there is a convergent gap over an arc of approximately 60° from the entry of the oil supply hole into the bearing bore to the point 16. A throttling element 18 in the form of a cock, valve or the like is provided in the oil supply hole 17. Element 18 makes it possible to restrict the oil supply partially or completely if the bearing loading is sufficiently high to prevent the shaft from rising or if quiet running is not adversely affected.

If the shaft bearing journals permit, for example in the case of overhung mounting or transmission shafts of constant diameter throughout, the bearing can be produced as a single-piece closed shell without a dividing plane. When boring out the bearing sliding surface using a rotary boring bar, production is possible using one single clamping. After the production of one bore, for example with $R_2$, it is sufficient to displace the bearing by the distance 9-10 relative to the first chucking position and to produce the bore with $R_3$. Time-wasting manual working operations or reclamping, which are necessary in some cases in the manufacture of the bearings of the type discussed in the background of the invention become unnecessary in the present design.

The "support" task is functionally separated, in the design according to the invention, from the function of the bearing shell 2, namely "guiding" the shaft 1. The design features necessary for this purpose, i.e. the size of the bores with $R_2$ and $R_3$ in relationship to one another and to the shaft diameter $R_1$ can, therefore, be selected to suit the particular demands made on the bearing. Generally speaking, however, $R_2$ will be selected equal to $R_3$, as in the embodiment shown in the drawing.

Experiments have confirmed the properties which were the objective of the bearing bore geometry developed on the basis of theoretical hydrodynamic considerations; i.e. high operating reliability, reduction in the frictional power, good stability properties at low loads and high rotational speeds and high load carrying capacity even at low rotational speeds. To this should be added, as an economic advantage, the simple manufacture of the bearing sliding surface.

The principles, preferred embodiments and modes of operation of the present invention have been described in the foregoing specification. The invention which is intended to be protected herein should not, however, be construed as limited to the particular forms described, as these are to be regarded as illustrative rather than restrictive. Variations and changes may be made by those skilled in the art without departing from the spirit of the present invention. Accordingly, the foregoing detailed description should be considered exemplary in nature and not as limiting to the scope and spirit of the invention as set forth in the appended claims.

I claim:

1. A sliding journal bearing, comprising a bearing bore having a bearing sliding surface for hydrodynamic lubricant wedge formation formed from first and second parallel cylinders that have first and second bearing axes separated by a predetermined distance in a diametral plane, at least one first and at least one second oil supply holes provided, respectively, underneath and above a horizontal dividing plane at right angles to a direction of a load through the first bearing axis, and inlets of the oil supply holes being displaced at an angle of at least approximately 35° relative to the horizontal dividing plane in a direction of rotation of a shaft located inside the cylinders.

2. A sliding journal bearing in accordance with claim 1, wherein radii of the first and second cylinders are equal, the distance between the bearing axes of the cylinders is equal to two times the bearing clearance, and an adjustable throttle is provided in an oil pipe upstream of the at least one oil supply hole located above the horizontal dividing plane.

* * * * *